United States Patent
Dewey

(10) Patent No.: US 9,839,199 B2
(45) Date of Patent: Dec. 12, 2017

(54) DOG FETCH TOY

(71) Applicant: ANIMAGANZA, LLC, Everett, WA (US)

(72) Inventor: Alan J. Dewey, Marysville, WA (US)

( * ) Notice: Subject to any disclaimer, the term of this patent is extended or adjusted under 35 U.S.C. 154(b) by 0 days.

(21) Appl. No.: 15/430,881

(22) Filed: Feb. 13, 2017

(65) Prior Publication Data

US 2017/0231195 A1 Aug. 17, 2017

Related U.S. Application Data

(60) Provisional application No. 62/294,573, filed on Feb. 12, 2016.

(51) Int. Cl.
*A01K 29/00* (2006.01)
*A01K 15/02* (2006.01)

(52) U.S. Cl.
CPC .................. *A01K 15/026* (2013.01)

(58) Field of Classification Search
CPC ..... A01K 15/025; A01K 15/02; A01K 15/026
USPC .................. 119/702, 707, 708, 709, 710, 711
See application file for complete search history.

(56) References Cited

U.S. PATENT DOCUMENTS

| | | | | |
|---|---|---|---|---|
| 6,216,640 B1 * | 4/2001 | Zelinger | ............. | A01K 15/026 119/707 |
| 2004/0134446 A1 * | 7/2004 | Keller | ................. | A01K 15/026 119/707 |
| 2009/0095231 A1 * | 4/2009 | Axelrod | ............... | A01K 15/026 119/709 |
| 2010/0186682 A1 * | 7/2010 | Myers, Jr. | ............ | A01K 15/026 119/709 |
| 2010/0224138 A1 * | 9/2010 | Axelrod | ............... | A01K 15/026 119/710 |
| 2012/0204809 A1 * | 8/2012 | Axelrod | ............... | A01K 15/025 119/709 |
| 2014/0130750 A1 * | 5/2014 | Valle | .................... | A01K 15/025 119/708 |
| 2014/0224184 A1 * | 8/2014 | Dewey | ................. | A01K 15/026 119/709 |

* cited by examiner

*Primary Examiner* — Trinh Nguyen
(74) *Attorney, Agent, or Firm* — Nathaniel A. Gilder; Jensen & Puntigam, PS

(57) ABSTRACT

An improved dog fetch toy product is disclosed. The fetch toy may generally have a bone-like shape, with an elongated middle section and bulbous end sections at either end. Cavities in the bulbous end sections may allow a person to pick up the fetch toy by inserting a finger into a cavity. The fetch toy may then be flung/thrown by the finger.

13 Claims, 2 Drawing Sheets

Side View          Top View

DOG FETCH TOY

CROSS-REFERENCE TO RELATED APPLICATIONS

This is a nonprovisional claiming priority under 35 U.S.C. §119 of U.S. Provisional Patent Application No. 62/294,573, entitled "DOG FETCH TOY", filed on Feb. 12, 2016. The prior application is incorporated by reference herein in its entirety.

BACKGROUND

The most common fetch toy is a basic tennis ball. The size, light weight and bounciness of the tennis ball make it ideal for fun and challenging play. But tennis balls have their problems. The compounds they are molded from are relatively soft, and many tough chewers can chew through them. Tennis balls are also flocked with a fleecy layer that is embedded into the tennis ball core compound. The thin fibers of this flocking can actually tear some dogs' gums, and the fiber itself can get caught in their throats which can present a choking hazard. Also, through play, tennis balls get dirty and gooey from dog saliva and dirt which sticks to the ball.

Other balls, sticks, and toys may also be used to play fetch. For all of these, significant athletic ability may be needed to throw the fetch toy a long distance, and long distance is often desirable in order to achieve meaningful play and exercise.

"Ball launcher" products have been developed to solve the problem of making fetch toys easier to throw farther. Ball launchers have the appearance of long ice cream scoopers on sticks. They allow the thrower to scoop up balls and fling them long distances. However, one problem with ball launchers is, in order to play fetch, a long piece of equipment (the ball launcher) must be carried around. Furthermore, the long handle of the ball launcher puts additional physical strain on the back, shoulder and arm of the thrower. Also, scooping up balls with ball launchers can be challenging when the dog is also going for the ball. Some dogs may "attack" the ball, either before, during, or after when the ball is scooped up. As a result, the scooper ends of ball launchers often get worn down and eventually destroyed.

There have been even more complex solutions to trying to improve the game of fetch. For example, toy cannons and mechanical pitchers have been developed which can launch tennis balls, instead of throwing them by hand. However, these solutions aren't ideal for the common dog owner who generally wants a simple, easy to carry solution for a traditional game of fetch with their dog.

SUMMARY

An improved dog fetch toy product is disclosed, as well as methods of making and using the fetch toy product. In some examples, a dog fetch toy product may include an elongated middle section having a middle section width, a middle section length, a proximal end, and a distal end. A first bulbous end section may be positioned at the proximal end, and a second bulbous end section may be positioned at the distal end. The first and second bulbous end sections may each comprise: a wall surrounding an inner cavity, wherein the wall comprises an end portion and a side portion, and at least one finger access opening in the side portion of the wall, wherein the finger access opening is adapted to allow insertion of a finger into the inner cavity. Additional aspects and features of this disclosure will be apparent from the detailed description and drawings.

BRIEF DESCRIPTION OF THE DRAWINGS

Various features and attendant advantages of the disclosed technologies will become fully appreciated when considered in conjunction with the accompanying drawings, in which like reference characters designate the same or similar parts throughout the several views, and wherein.

DETAILED DESCRIPTION

Figure 1:
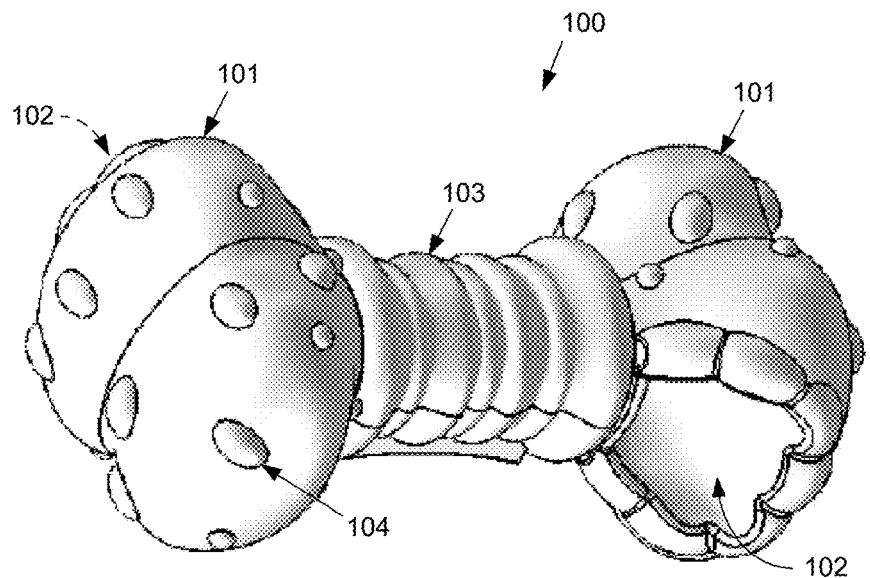
FIG. 1 illustrates an example dog fetch toy product.

Prior to explaining embodiments of the invention in detail, it is to be understood that this disclosure is not limited to the details of construction or arrangements of the components and method steps set forth in the following description or illustrated in the drawings. Embodiments of this disclosure are capable of other embodiments and of being practiced and carried out in various ways. Also, it is to be understood that the phraseology and terminology employed herein are for the purpose of the description and should not be regarded as limiting.

This disclosure describes an improved "Flinger" dog fetch toy product. The disclosed fetch toy may generally have a bone-like shape, with an elongated middle section and bulbous end sections at either end. Cavities in the bulbous end sections may allow a person to pick up the fetch toy by inserting a finger into a cavity. The fetch toy may then be flung/thrown by the finger.

The disclosed fetch toy design has a number of advantages. It is easy to throw a long distance, because the hand and finger act as a launcher, eliminating the need for extra ball launcher equipment. The finger touches only an inner cavity of the fetch toy, which is protected from the gooey saliva and dirt that accumulates through play. The aerodynamics of the bulbous end sections on either end of the elongated middle section help stabilize and may optionally lift the fetch toy as it flies end-over-end when flung. A variety of other advantages will be understood with the benefit of this disclosure.

FIG. 1 illustrates an example dog fetch toy product, in accordance with some embodiments of this disclosure. FIG. 1 includes a dog fetch toy product 100, comprising an elongated middle section 103 having a middle section width, a middle section length, a proximal end, and a distal end. For example, the proximal end may be at the left side of elongated middle section 103, and the distal end may be at the right side of elongated middle section 103.

Bulbous end sections 101 include a first bulbous end section positioned at the proximal end, and a second bulbous end section positioned at the distal end. The first and second bulbous end sections 101 may each comprise: a wall surrounding an inner cavity 102, wherein the wall comprises an end portion and a side portion. For example, the end portions may be the portions of bulbous end sections 101 which are generally perpendicular with the length of the elongated middle section 103, and the side portions may be the portions of bulbous end sections 101 which are generally parallel with the length of the elongated middle section 103.

Bulbous end sections 101 may include at least one finger access opening in the side portion of the wall, wherein the finger access opening is adapted to allow insertion of a finger into the inner cavity 102. Finger access openings and inner cavities 102 may generally allow the dog fetch toy product 100 to be picked up and flung by finger. Moreover, finger access openings and inner cavities 102 may double as treat dispensers for some users. Some pet owners may enjoy filling one or both inner cavities 102 with a soft treat such as peanut butter.

Figure 2:
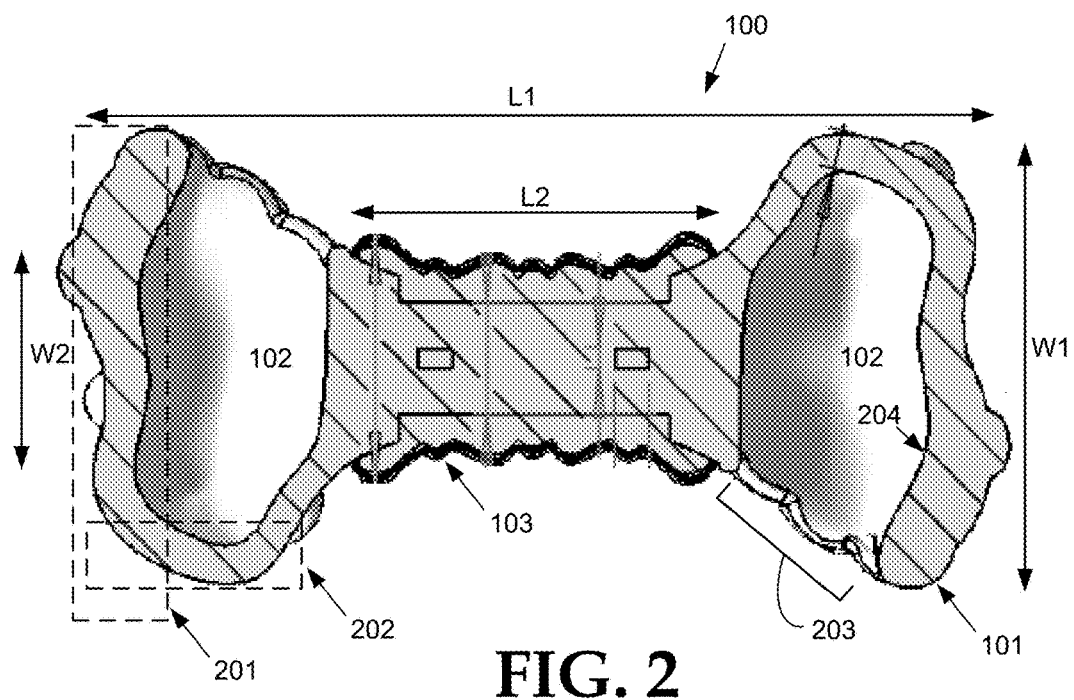
FIG. 2 illustrates a cross sectional view of an example dog fetch toy product.

FIG. 2 illustrates a cross sectional view of dog fetch toy product 100, in accordance with some embodiments of this disclosure, wherein like elements introduced in FIG. 1 are assigned like identifiers. In FIG. 2, a dashed boxes are used to generally indicate an example end portion 201 and an example side portion 202 of a wall surrounding an inner cavity 102 of a bulbous end section 101. Furthermore, a bracket is used to designate a finger access opening 203 in a side portion of a bulbous end section 101.

In some embodiments, bulbous end section 101 may comprise walls which are perforated or which otherwise include additional openings, in addition to the illustrated finger access openings 203. For example, side portions 202 may be replaced by support members that generally connect elongated middle section 103 with end portions 201, and so side portions 202 may, but need not include solid, impermeable walls. Also, some embodiments may include additional finger access openings in bulbous end sections 101, e.g., finger access openings may be included on each of two opposing sides of a bulbous end section 101. In some cases, three or four finger access openings may be included in a bulbous end section 101 if desired.

FIG. 2 illustrates an example shape of inner cavities 102. The shape of inner cavities 102 may include at least one finger depression 204 on an inner surface of the end portions 201 of the walls. In FIG. 2, the shape of inner cavities 102 generally comprises two finger depressions therein, as shown. Finger depression 204 may facilitate picking up the dog fetch toy 100 with a single finger, as well as flinging the dog fetch toy 100.

In some embodiments, the finger access openings 203 in the bulbous end sections 101 may face in opposite directions, as illustrated in FIG. 2. In other words, the at least one finger access opening in the first bulbous end section may face in an opposite direction as the at least one finger access opening in the second bulbous end section. However, it will be appreciated that in alternative embodiments, finger access openings may face in a same direction or in any desired directions.

While FIG. 2 generally illustrates the bulbous end sections 101 as identical, while oriented in opposite directions, in some embodiments, the bulbous end sections 101 may differ from one another. For example, in some embodiments only one of the bulbous end sections 101 may comprise an inner cavity 102, while the other bulbous end section 101 need not comprise an inner cavity 102. In some embodiments, a bulbous end section 101 without an inner cavity 102 may instead comprise a treat dispenser, a float to allow the dog fetch toy 100 to float on water, a glow in the dark material, a neon colored material, a Light Emitting Diode (LED) light, a scented material, or any number of other features. It will be appreciated that features such as a float, a glow in the dark material, a neon colored material, a LED light, a scented material, or otherwise may alternatively be incorporated into any other part of a dog fetch toy 100 in some embodiments.

In some embodiments, fetch toy product 100 may be designed to include "Bounce n' Bound" design principles. The "bounce" and "bound" refers to a general tendency of the fetch toy product 100 to continue bouncing and "cart wheeling" (bounding) in a forward direction after it hits the ground. In order to achieve good "Bounce n' Bound" capabilities, the bulbous end sections 101 may be of sufficient size and density, so that the weight of the bulbous end sections 101 causes fetch toy product 100 to spin end-over-end when flung. Also, the thickness and stiffness of the walls forming bulbous end sections 101 may be such that fetch toy product 100 bounces off of bulbous end sections 101. The use of rubber for bulbous end sections 101 is generally appropriate to achieve desired bounce. For example, for embodiments of the fetch toy product 100 illustrated in detail herein, and generally having the dimensions and weight described in detail herein, an 80 durometer synthetic rubber material, or otherwise a rubber material between 70-90 durometer, may be appropriate to achieve desired bouncing and bounding. Furthermore, a generally rounded shape of bulbous end sections 101, including a rounded shape of bulbous end sections 101 over the finger access windows 203, e.g., as illustrated in FIG. 2, allows fetch toy product 100 to continue bouncing and bounding in a forward direction.

FIG. 2 illustrates an overall length L1 and overall width W1 for the dog fetch toy 100. In some embodiments, the overall length L1 of the dog fetch toy may be about 5.2 inches, or otherwise, between about 4 inches and about 7 inches. In some embodiments, the overall width W1 of the dog fetch toy may be about 2.5 inches, or otherwise, between about 2 inches and about 3.5 inches. FIG. 2 also illustrates an example length L2 of the elongated middle section 103, and an example width W2 of the elongated middle section 103. In an example wherein the overall length and width (L1 and W1) are 5.2 inches and 2.5 inches, respectively, the elongated middle section 103 length and width (L2 and W2) may be about 2 inches and 1.25 inches, respectively. For larger or smaller dog fetch toys, the dimensions L2 and W2 of the elongated middle section 103 may scale up or down proportionally to L1 and W1.

In some embodiments, the elongated middle section 103 may be generally cylindrical, and the first and second bulbous end sections 101 may be generally rounded e.g., as illustrated in FIG. 1. It will be appreciated that other shapes such as polygonal, rectangular, and square shapes may be made in some embodiments. Also, while the bulbous end sections 101 are illustrated herein as having widths larger than the elongated middle section 103, it will be appreciated that some embodiments may comprise bulbous end sections 101 of similar or lesser width than elongated middle section 103.

In some embodiments, the surface of the dog fetch toy product 100 may be textured, e.g., by imparting to the surface a matte or speckled finish, which generally shows wear and tear less than smooth surfaces. Also, the surface of the dog fetch toy product 100 may comprise ribs, knobs, or other raised texture elements 104, e.g., as illustrated in FIG. 1. Such raised texture elements 104 massage dogs' gums and add interest to the fetch toy.

In some embodiments, a weight of the dog fetch toy product 100 may be about 5 and 5/8 ounces, or otherwise between about 3.5 ounces and about 7.5 ounces. While weight may vary with the materials used and dimensions of the dog fetch toy product 100, the weight will also affect the ability to fling the dog fetch toy product 100 as well as the ability of the dog fetch toy product 100 to overcome air resistance when thrown. In some embodiments, the weight of the dog fetch toy product 100 may be reduced (or conversely, the volume of the dog fetch toy product 100 may be increased) such that the overall density of the dog fetch toy product 100 may be less than the density of water, and therefore the dog fetch toy product 100 may float on water, in order to support water fetch games.

Figure 3:
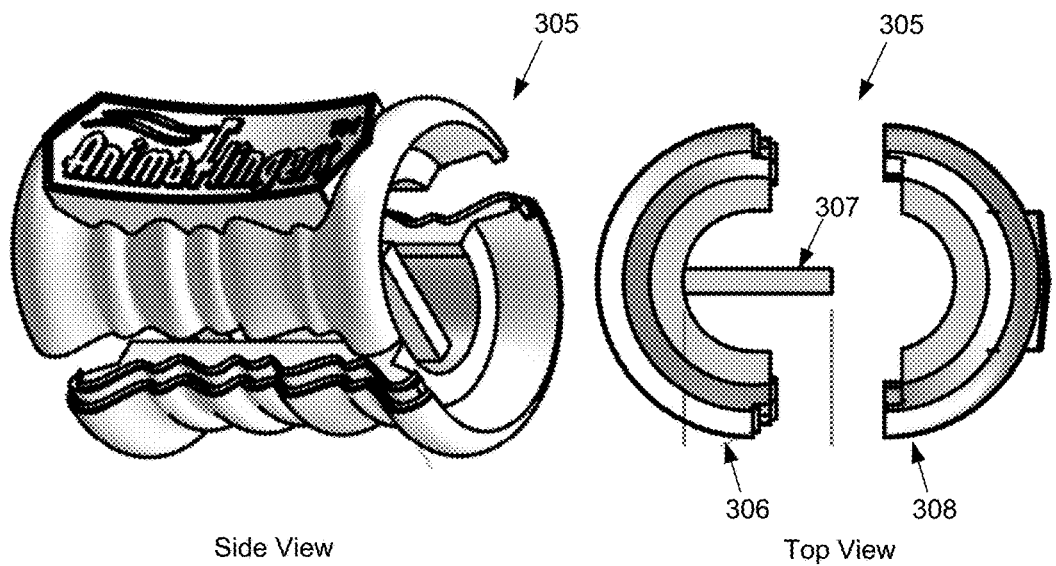
FIG. 3 illustrates an example jacket which may encase the elongated middle section of the dog fetch toy product.

FIG. 3 illustrates an example jacket 305 which may, in some embodiments, encase the elongated middle section 103 of the dog fetch toy product 100. FIG. 3 provides a side view and a top view of jacket 305. As can be seen in the top view, the jacket 305 may optionally be made from two half cylinders 306 and 308, which may fit together as male and female members. Internal connectors 307 may optionally extend between the half cylinders 306 and 308.

In some embodiments, the elongated middle section 103 may be at least partially made of nylon, e.g., in the form of jacket 305, and the first and second bulbous end sections 101 may be at least partially made of rubber. For example, the first and second bulbous end sections 101 and an inner core of the elongated middle section 103 may be made from a contiguous piece of molded rubber, in an inner core shape such as outlined in FIG. 2. The inner core of the elongated middle section 103 may be encased by a jacket 305 such as illustrated in FIG. 3. The inner core of the elongated middle section 103 and jacket 305 may also be understood with reference to FIG. 2. The two half cylinders 306 and 308 may be supersonic welded, or otherwise affixed together over the inner core of the elongated middle section 103, with the internal connectors 307 extending through holes in the inner core of the elongated middle section 103.

In some embodiments, the jacket 305 may optionally be made from 100% nylon which bristles when chewed and acts a natural dental chew. The jacket 305 may also provide a durable cover for the elongated middle section 103 which extends the life of the dog fetch toy product 100, while the relatively softer rubber of the bulbous end sections 101 is bouncier and less likely to do damage if the dog fetch toy product 100 is accidentally thrown in the wrong direction.

Figure 4:
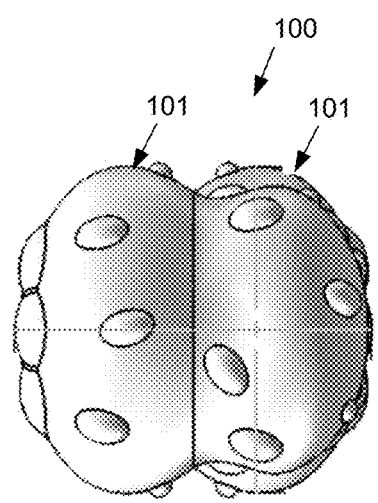
FIG. 4 illustrates an end view of an example dog fetch toy product.

FIG. 4 illustrates an end view of the example dog fetch toy product 100. The end view shows the bulbous end sections 101 as well as an example distribution of raised texture elements thereon. The texture elements at left are over a finger access window of a bulbous end section 101. Raised texture elements may optionally be clustered around the edge of a finger access window to make the finger access window readily identifiable as well as to thicken the wall of the bulbous end section 101 around the finger access window.

While various embodiments have been disclosed herein, other aspects and embodiments will be apparent to those skilled in art

The invention claimed is:

1. A dog fetch toy product, comprising:
an elongated middle section having a middle section width and a middle section length, the middle section length comprising a proximal end and a distal end thereof;
a first bulbous end section positioned at the proximal end of the middle section length; and
a second bulbous end section positioned at the distal end of the middle section length;
wherein at least one of the first and second bulbous end sections comprises:
a wall surrounding an inner cavity, wherein the wall comprises an end portion at least partially perpendicular to the middle section length, and a side portion extending between the elongated middle section and the end portion; and
at least one finger access opening in the side portion of the wall, wherein the finger access opening provides an entrance into the inner cavity surrounded by the side and end portions of the wall.

2. The dog fetch toy product of claim 1, further comprising at least one finger depression on an inner surface of the end portion of the wall.

3. The dog fetch toy product of claim 1, wherein the first and second bulbous end sections each comprise:
a wall surrounding an inner cavity, wherein the wall comprises an end portion and a side portion; and
at least one finger access opening in the side portion of the wall, wherein the finger access opening is adapted to allow insertion of a finger into the inner cavity.

4. The dog fetch toy product of claim 3, wherein the at least one finger access opening in the first bulbous end section faces in an opposite direction as the at least one finger access opening in the second bulbous end section.

5. The dog fetch toy product of claim 1, wherein the elongated middle section is generally cylindrical and wherein the first and second bulbous end sections are generally rounded.

6. The dog fetch toy product of claim 1, wherein a weight of the dog fetch toy product is between 3.5 ounces and 7.5 ounces.

7. The dog fetch toy product of claim 1, wherein an overall length of the dog fetch toy product is between 4 inches and 7 inches.

8. The dog fetch toy product of claim 1, wherein an overall width of the dog fetch toy product is between 2 inches and 3.5 inches.

9. The dog fetch toy product of claim 1, wherein the elongated middle section is at least partially made of nylon, and wherein the first and second bulbous end sections are at least partially made of rubber.

10. The dog fetch toy product of claim 9, wherein the first and second bulbous end sections and an inner core of the elongated middle section are made from a contiguous piece of molded rubber, and wherein the inner core of the elongated middle section is encased by a nylon jacket.

11. The dog fetch toy product of claim 1, wherein an overall density of the dog fetch toy product is less than density of water, and therefore the dog fetch toy product floats on water.

12. The dog fetch toy product of claim 1, wherein a surface of the dog fetch toy product is textured.

13. The dog fetch toy product of claim 1, wherein a surface of the dog fetch toy product comprises ribs, knobs, or other raised texture elements.

* * * * *